United States Patent
Meza

(10) Patent No.: US 6,916,026 B2
(45) Date of Patent: Jul. 12, 2005

(54) POWERED TURNTABLE WITH UNIVERSAL, SELF-ADJUSTING CHUCK FOR HOLDING AUTO WHEELS AND THE LIKE FOR POLISHING

(76) Inventor: Arturo Meza, 2765 E. 58th St., Huntington Park, CA (US) 90255

( * ) Notice: Subject to any disclaimer, the term of this patent is extended or adjusted under 35 U.S.C. 154(b) by 687 days.

(21) Appl. No.: 09/766,475

(22) Filed: Jan. 19, 2001

(65) Prior Publication Data

US 2003/0127810 A1 Jul. 10, 2003

(51) Int. Cl.$^7$ .............................................. B23B 31/16
(52) U.S. Cl. ...................... 279/110; 279/133; 279/4.12; 279/118; 157/16
(58) Field of Search ................................. 279/110, 118, 279/133, 4.1, 4.12, 119; 157/16, 18, 21

(56) References Cited

U.S. PATENT DOCUMENTS

| | | | | |
|---|---|---|---|---|
| 6,046 A | * | 1/1849 | Grant | 279/118 |
| 725,346 A | * | 4/1903 | Krug | 279/46.3 |
| 758,195 A | * | 4/1904 | Schweinert et al. | 72/402 |
| 1,531,327 A | | 3/1925 | Wood et al. | |
| 2,544,303 A | | 3/1951 | Earle et al. | |
| 2,573,166 A | | 10/1951 | Sundt | |
| 2,667,356 A | * | 1/1954 | Forward | 279/110 |
| 2,828,134 A | | 3/1958 | Buck et al. | |
| 2,979,091 A | * | 4/1961 | Noall | 157/15 |
| 3,145,997 A | * | 8/1964 | Moses | 279/2.16 |
| 3,156,480 A | * | 11/1964 | Wuesthoff | 279/133 |
| 3,606,808 A | * | 9/1971 | Bowden | 82/165 |
| 3,845,962 A | | 11/1974 | Molin | |
| 3,933,347 A | * | 1/1976 | Stoffels | 279/127 |
| 4,034,786 A | * | 7/1977 | Feldmann et al. | 157/18 |
| 4,177,914 A | * | 12/1979 | Clavin | 228/49.3 |
| 4,250,936 A | * | 2/1981 | du Quesne | 157/17 |
| 4,517,773 A | | 5/1985 | Heiden et al. | |
| 4,861,086 A | | 8/1989 | Toral | |
| 5,172,617 A | | 12/1992 | Rohm | |
| 2003/0102640 A1 | * | 6/2003 | Saito | 279/110 |
| 2003/0222415 A1 | * | 12/2003 | Mandokoro et al. | 279/118 |

* cited by examiner

Primary Examiner—Daniel W. Howell
(74) Attorney, Agent, or Firm—Aaron L. Patton

(57) ABSTRACT

A new and improved powered rotating turntable with a universal, self-adjusting chuck for holding auto wheels and the like for polishing, which includes a pneumatically-adjusted, self-centering metal chuck for gripping and holding specialty wheel rims of motor vehicles for polishing. The chuck is self-adjusting, self-centering and is able to handle any diameter of wheel. With the self-adjusting, self-centering capability, this chuck eliminates the need to set up a new jig for gripping and holding a wheel rim each time a series of rims having a different diameter or style from the last series of wheel rims previously chucked-up and polished, thereby greatly improving the efficiency of the entire wheel polishing operation in terms of both time and cost of operation.

18 Claims, 4 Drawing Sheets

POWERED TURNTABLE WITH UNIVERSAL, SELF-ADJUSTING CHUCK FOR HOLDING AUTO WHEELS AND THE LIKE FOR POLISHING

BACKGROUND OF THE INVENTION

1. Field of the Invention

The invention relates to a new and improved powered rotating turntable and chuck, and, more specifically, with a pneumatically-adjusted, self-centering, self-adjusting chuck for holding auto wheels and the like for polishing.

2. Description of the Prior Art

Various devices and mechanical arrangements have been used in the prior art to quickly grip and hold metal parts for polishing.

Professional polishers of custom wheels take great pride in their work and enjoy performing specialized buffing of rims. Unfortunately, this type of work can become time-consuming and difficult if a number of different size wheels need to be polished. The individual may encounter custom wheels of 13, 14, 15, 16, 17 and up to 21 inches in diameter. This means that the jig must be continually changed to accommodate the particular size of wheel to be polished. Making these constant changes can be rather aggravating and can even make the task less enjoyable for the worker.

In an effort to improve the way wheels of vehicles get polished, the applicant herein perceived the need for (and, as set forth elsewhere in this specification, has invented) a universal polishing chuck. This universal polishing chuck would be all that a person would need in order to polish specialized wheels of all shapes and sizes. An air cylinder would adjust three pulling brackets around the outside of a turntable made, for example, of a ½ inch-thick steel plate, to hold the wheel by its lip on the top side of the turntable. Once the wheel has been properly positioned and gripped, it would be ready for polishing. Subsequent wheels to be polished may require simple adjustment of the pulling brackets to accommodate the particular diameter.

The universal polishing chuck would be ideal for businesses that engage in extensive wheel polishing and need a means of converting between wheel sizes without delays. Instead of continually stopping the operation for changing a jig, the same chuck could be used for each wheel. This would speed up the wheel polishing process for the worker and make the task more enjoyable. Increased productivity would also result with the individual able to polish a greater number of specialized wheels in the same period of time. This could increase profits for companies and improve job satisfaction.

The strong steel construction of the universal polishing chuck could also help ensure a long, reliable life for the business. The pneumatic cylinder used to operate the three pulling brackets could be easily operated with a compressed air supply readily available within the shop. The simplicity of the pulling bracket design would ensure the device is simple for the user to operate, allowing changes in wheels to be completed in a fraction of the time it would normally take.

Of course, end users of the specialized wheels could marvel at the deep, gleaming polished finish of the metal. This could help attract added attention to the wheels when applied and make the motorist proud to be seen driving the vehicle. This could leave both the customer and the detailer with a positive feeling. The professional results rendered with the use of the universal polishing chuck could even result in word-of-mouth advertising that increases business for a detailing shop.

In regard to the universal polishing chuck, it is interesting to note trends relating to the specialty automotive market. According to the latest research by the Speciality Equipment Market Association (SEMA), Diamond Bar, Calif., the performance market amounts to $10 billion at retail. SEMA splits the market into three segments: Appearance (basically all custom accessories), Handling (basically tires, wheels, and ride control), and Performance (all internal and external engine parts).

Of the three, automotive appearance products are the fastest growing market segment. They are led by light truck accessories, growing at 15 percent annually. This represents 3.27 billion of the automotive specialty market. Performance parts represent $3.58 billion in retail sales, almost $500 million of which involves racing parts. Between government regulations and technology, however, the overall growth of performance parts is barely keeping pace with inflation. Handling products represented $3.15 billion of the total.

U.S. Pat. No. 4,034,786 (Feldmann et al.) The patent to Feldmann et al. discloses a wheel chuck in which three wheel engaging chucks are disposed on the ends of three lever arms.

U.S. Pat. No. 4,517,773 (Heiden et al.) The patent to Heiden et al. discloses a grinding wheel having a plurality of flaplike members extending therefrom.

U.S. Pat. No. 5,172,617 (Rohm) The patent to Rohm discloses a lathe chuck.

SUMMARY OF THE INVENTION AND OBJECTS

Fundamentally, the invention disclosed herein is basically described as a new and improved powered rotating turntable with a self-adjusting chuck for gripping and holding auto wheels for polishing. The chuck is pneumatically controlled (with pneumatically-operated brackets—also referred to as fingers or jaws) for gripping specialty wheel rims of motor vehicles to facilitate the polishing thereof. The chuck is self-adjusting and is able to handle any diameter of wheel. With its self-adjusting, self-centering capability, the need to set up a new jig each time that a group of rims having a diameter or style different than the last series of wheel rims that were polished is eliminated thereby greatly improving the efficiency of the entire wheel polishing operation both in terms of time and cost of operation. It has a mounting shaft that is standard for semi-automatic wheel polishing machines. Once the wheel has been polished, the air (or other fluid being used) would be vented and the pneumatically-operated brackets would return to their original unactuated position for receiving the next sized wheel to be polished. Basically, this invention is readily adapted to polishing all of the currently standard-sized wheels and rims, including, but not limited solely thereto, 13, 14, 15, 16, 17, and 21 inches in diameter wheels without stopping to change jigs as normally would be the case. Obviously, this pneumatically-operable chuck could be used by any business that would be involved in the polishing of specialty metal wheels.

It is a general object of the instant invention disclosed herein to provide a powered turntable incorporating a pneumatically-operable chuck for gripping and holding metal rims or wheels to polish such rims or wheels.

Another primary and important object of the invention disclosed herein is to provide a powered turntable with a pneumatically-operated chuck of the type which is to be operated with greater facility and reliably than previous machines of this type.

It is yet a still further and important object of the present invention to provide an improved construction and arrangement of parts which is durable, efficient and readily manufactured.

Another further important and primary object of the invention is to provide a powered turntable with a pneumatically-powered, self-adjusting chuck which automatically adapts to the particular size wheel so the operator never has to change jigs, thereby saving time, money and effort, particularly when polishing a number of wheels.

Other objects and advantages of the invention will become apparent to those acquainted with equipment of this type upon reading the following specification and inspecting the accompanying drawings here set forth.

The invention accordingly consists in the features of construction, combinations of elements and arrangement of parts which will be exemplified in the construction hereinafter set forth, and the scope of the application will appear in the appended claims.

For a more complete understanding of the nature and advantages of this invention reference should be had to the following detailed description, which describes the best illustrative embodiments of this invention at present known to the applicant, taken in connection with the accompanying drawings, in which:

DESCRIPTION OF ONE PREFERRED EMBODIMENT OF THE INVENTION

Figure 1:
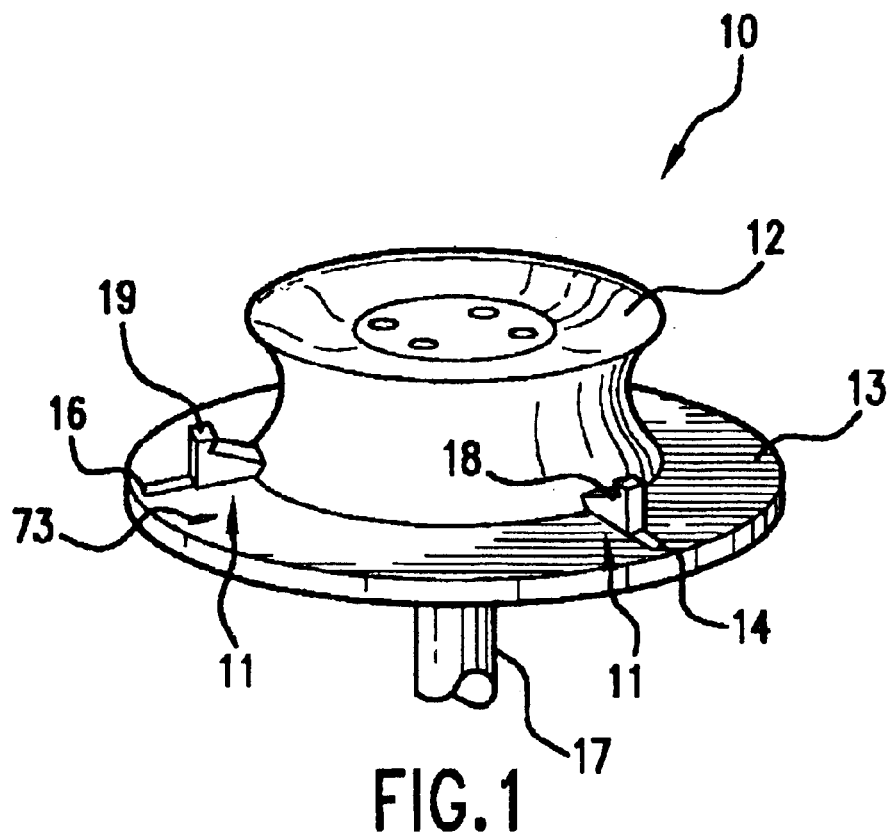
FIG. 1 is a perspective view of the invention described and disclosed herein shown gripping and holding a wheel rim for polishing.
Figure 5:
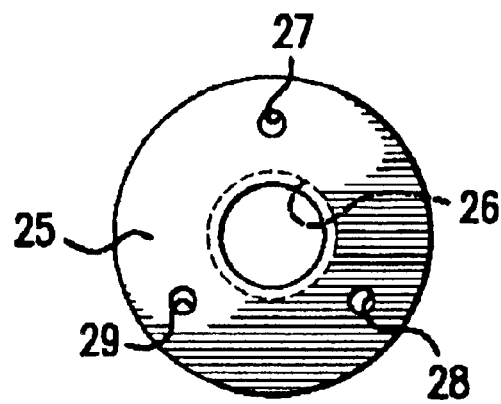
FIG. 5 is a top view of the control disk of the present invention.
Figure 2:
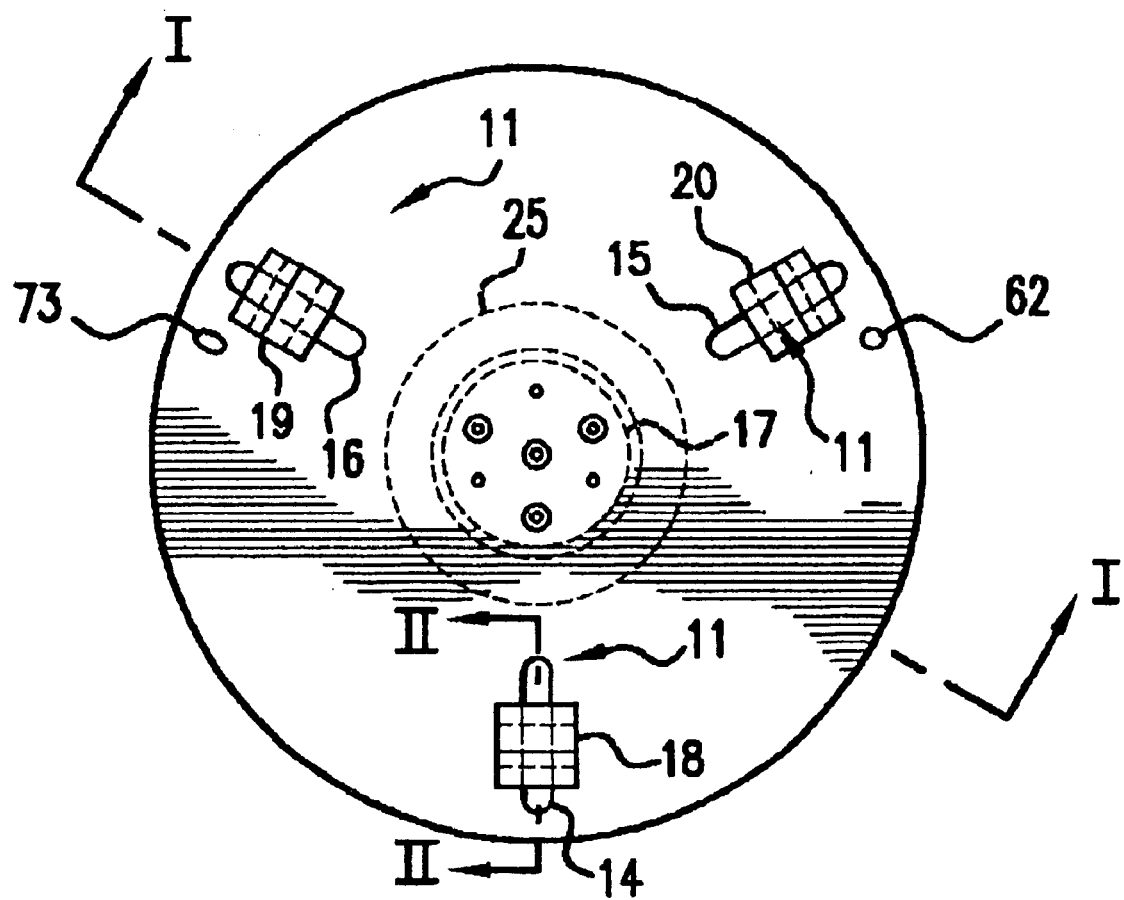
FIG. 2 top view of the present invention illustrating the three (3) gripping and retention chuck fingers for retaining the rim of a vehicle wheel.

With continuing reference now to all of the Drawings herein, and with special emphasis now on FIG. 1, there is shown and described a new and improved automatic and self-adjusting universal chuck for holding and auto wheels, generally indicated at 10. The new and improved automatic and self-adjusting universal polishing chuck and turntable assembly 10 is typically used for positioning and retaining an auto wheel 12, generally indicated at 10, and includes a pneumatically-adjusted metal chuck generally indicated at 11 as shown in FIG. 2. It is used for gripping and rotating wheel rims of motor vehicles in order to polish the wheel rims. The chuck 11 is self-adjusting and is able to handle any diameter of wheel. With the self-adjusting capability, the need to set up a new jig each time that a series of rims having a different diameter or style than the last series of wheel rims polished is eliminated. As a result, the efficiency of the entire wheel polishing operation is greatly improved in terms of the amount of time needed to polish the wheel rim and in a reduction in the cost of labor to perform the polishing operation.

One of the preferred embodiments of the instant invention is to provide a new and unique combination powered turntable 13 with a self-adjusting, self-centering chuck 11 for holding and positioning an auto wheel 12, or the like, including a powered turntable 13 having at least three radially-arranged, equidistantly-disposed slots 14, 15, and 16 therein, a hollow drive shaft 17 centrally mounted to the turntable 13 for driving the turntable 13, three jaws 18, 19, and 20 slideably mounted in the slots 14, 16, and 15 in the turntable 13 for gripping and holding the auto wheel 12 to be polished, a bearing 21 having an inner race 22 and an outer race 23 with bearings 24 housed therebetween, the inner race 22 being mounted on the drive shaft means 17, an annular disk 25 having a centrally located receptacle 26 for receiving the outer race 23 of the bearing 21 therein, the receptacle 26 adapted to operably receive and mount the outer race 23 of the bearing means 21 therein, the disk means 25 having at least three equidistant threaded receptacles 27, 28 and 29 for receiving threaded fasteners 30, 31 and 32 therein, whereby the disk means 25 is rotatably movable independently of the rotating movement of the drive shaft means 17, at least three longitudinal position control arms 33, 34, and 35 for positioning the jaws 18, 19 and 20 respectively in the slots 14, 16, and 15 in the turntable 13, each control arm having a pair of oppositely disposed ends with an aperture in each end thereof. Apertures 36, 37 are in the opposite ends of control arm 33. Control arm 34 has a pair of oppositely disposed apertures 38, 39, and control arm 35 has a pair of apertures 40, 41. Pivot fasteners 42, 44, and 46 are threaded into their respective pivot receptacles (each pivot receptacle being similar in this embodiment to pivot receptacle 47 shown in FIG. 6). and are used to pivotally secure each of the control arms 33, 34 and 35, respectively, to the sliding guide blocks 48, 49, 50 which are, in turn, respectively, secured to the jaws 19, 18 and 20 and connected via their respective control arms 33, 34, and 35 to the disk 25.

Figure 6:
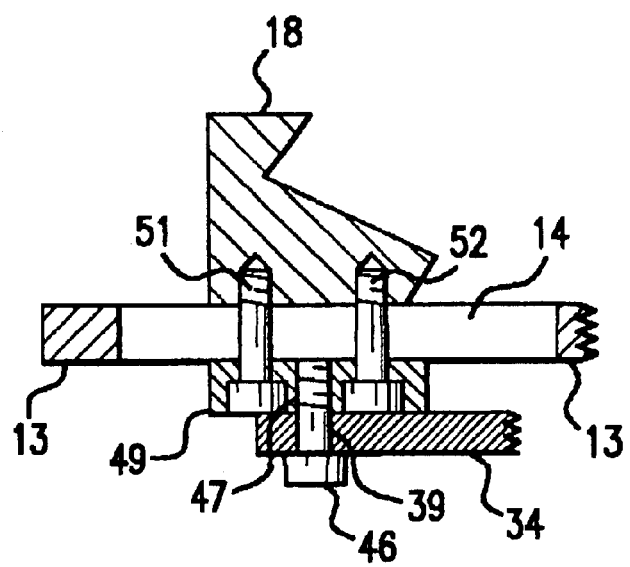
FIG. 6 is an enlarged, vertical cross-sectional view of one of the three (3) jaws of the instant invention described herein forming the chuck for holding the workpiece, such as an automobile wheel, for polishing.

The pivot fasteners 42, 44, and 46 are respectively indirectly secured to the jaws 19, 18 and 20, respectively, via sliding guide blocks 48, 49, and 50, respectively disposed in or adjacent to the slots 16, 14 and 15 directly beneath the respective jaws 19, 18 and 20. The sliding guide blocks 48, 49, and 50, respectively, are secured directly to the jaws 19, 18, and 20 via a pair of threaded bolts one example of which is shown in FIG. 6. One of the three jaws, jaw 18 is shown in cross-section in FIG. 6 and is disposed over slot 14 in the turntable 13. The sliding guide block 49 is secured to the bottom of the jaw 18 via a pair of threaded bolts 51 and 52. The other jaws 19 and 20 are similarly arranged and connected with a pair of threaded bolts to the sliding guide blocks 48 and 50, respectively, and disposed in the corresponding slots 16 and 15 as is jaw 18 in FIG. 6. In this way, each of the pairs of apertures in the ends of control arms, 33, 34 and 35 are pivotally secured between the disk 25 and the sliding guide blocks 48, 49 and 50 thereby controlling the position of the jaws 18, 19 and 20 along the slots 14, 16, 15 via the pivotal connection, respectively, to the guide blocks 49, 48, 50.

Figure 4:
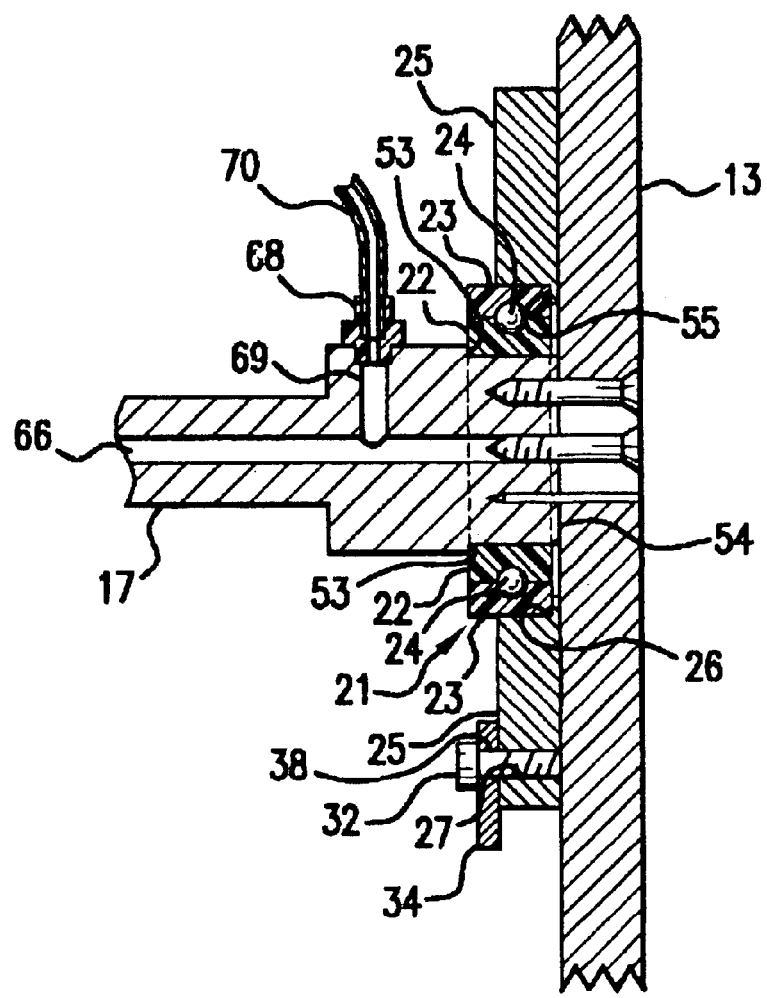
FIG. 4 is a side cross-sectional view of the driving shaft, bearing and disk assembly, and the central portion of the turn table.

To prevent lateral movement of the inner race 22 of the bearing 21 away from the nearest end 54 of the drive shaft 17, a stop means in the form of a undercut portion of the drive shaft 17 forming a shoulder 53 is provided as shown in FIG. 4. Correspondingly, the outer race 23 is seated with a receptacle 26 in the disk 25 which has a undercut shoulder 55 therein as illustrated in FIG. 4. In this fashion, the entire bearing 21 is restricted from lateral movement on the drive shaft 17.

It should be noted, at this time, that the rotary movement of the turntable 13 is independent of the rotary movement of the disk 25. The reason for this is self-evident.

Figure 3:
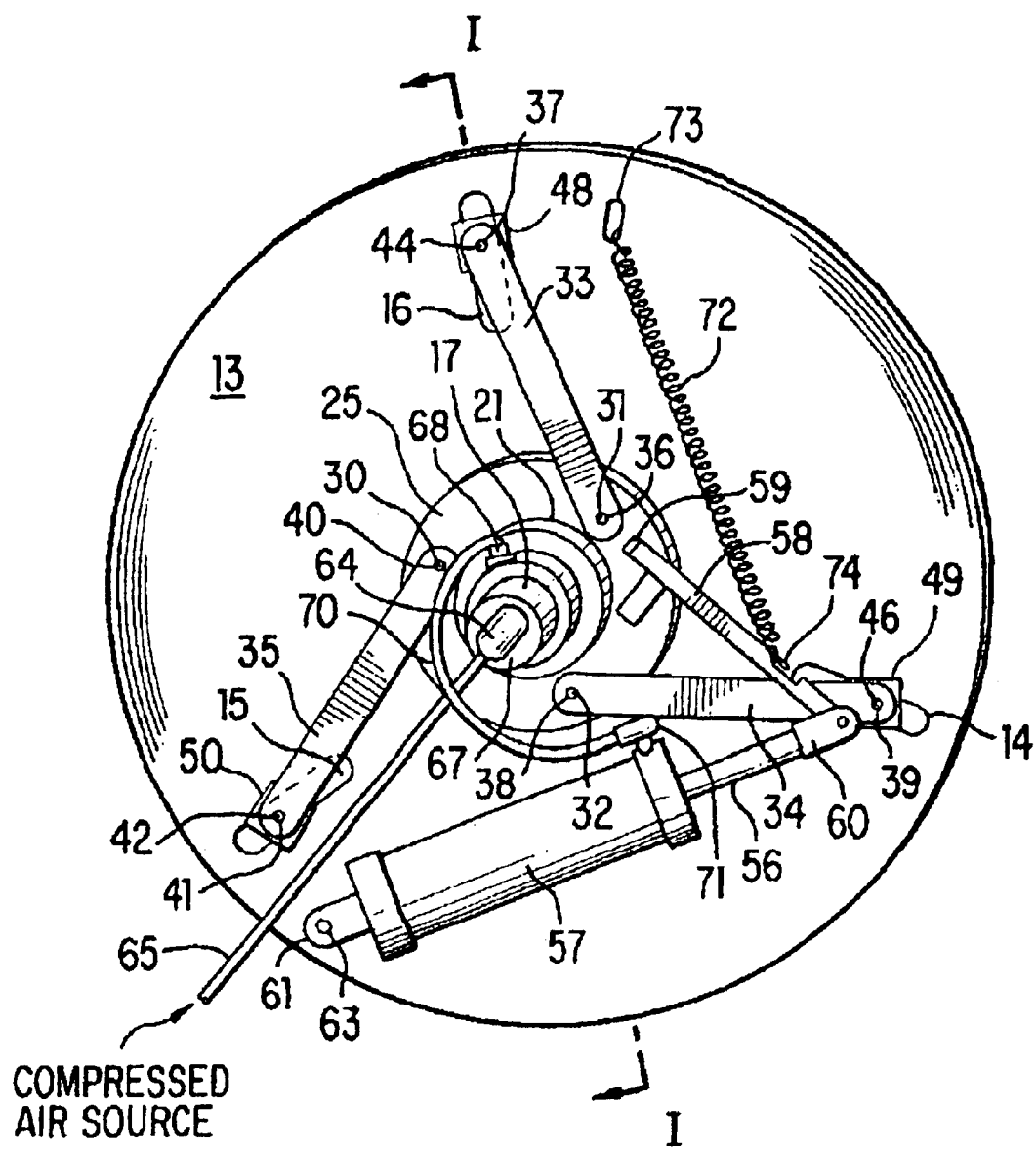
FIG. 3 is a bottom slightly perspective view of the present invention illustrating the pneumatically powered mechanism for concurrently actuating each of the three (3) gripping and retention chuck fingers for retaining the rim of a vehicle wheel.

With special emphasis now on FIG. 3, a pneumatically-operated piston-driven shaft 56, which is part of a pneumatic actuator, the shaft 56 being longitudinally moveable within a housing 57, is used to operate a positioning and locking arm 58 for the disk 25. One end 59 of the disk positioning and locking arm 58 is preferably securely mounted to the disk 25 by welding the one end 59 of the arm 58 directly to the disk 25. The opposite end of the arm 58 has an aperture which is pivotally secured to a clevis 60 mounted on the end of the shaft 56 via a fastener, such as a bolt and nut. The other end of the housing 57 is pivotally mounted to the bottom of the turntable 13 via a clevis 61 through which a bolt 63 is mated to a threaded receptacle 62 as shown in FIG. 2 in the turntable 13.

A source of compressed air is delivered to the pneumatic actuator comprised in this embodiment of the shaft 56 mounted within the housing 57 via a swivel valve 64 connected to a hollow portion 66 of the drive shaft 17 as shown in FIG. 4, at the far end 67 of the drive shaft 17. The swivel valve 64 remains in a relatively fixed position while the drive shaft 17 is rotationally driven to drive the turntable 13. The swivel valve 64 is connected to the source of compressed air via tubing 65 as illustrated in FIG. 3. In turn, as shown in FIG. 4, the hollow portion 66 of the drive shaft 17 is connected to a tubing connector 68 that is connected to a second tubing 70 via a cross-bored passageway 69 in the drive shaft 17 which intersects the hollow portion 66 of the drive shaft 17. The other end of the second tubing 70 is connected via a second tubing connector 71 which is mounted to the housing 57 of the pneumatic actuator. The second tubing connector 71 is in pneumatic connection with the inside of the housing 57 of the pneumatic actuator.

In normal operation, without the application of the source of compressed air the housing 57 of the pneumatic actuator, the shaft 56 is, "at rest", and is fully extended from the housing 57. Such full extension of the shaft 56 is ensured by the tension bias produced by the spring 72 which is fixedly anchored at one end to the table 13 via an aperture 73 in the table 13 as shown in FIGS. 2 and 3. The opposite end of the spring 72 is connected to the positioning and locking arm 58 via a hook section 74 formed in the arm 58. The spring 72 is adjusted to exert a continuous tension biasing force between the table 13 and the positioning and locking arm 58 so that after the compressed air is relieved from the housing 57 of the pneumatic actuator the force exerted thereon by the shaft 56 when the compressed air is delivered to the housing 57 of the pneumatic actuator ceases, the positioning and locking arm 58 is moved by the tension forces exerted by the spring 72 to the jaws 18, 19 and 20 unlocked position within the slots 14, 16 and 15.

It is also to be understood that the language used in the following claims is intended to cover all of the generic and specific features of the invention herein described and all statements of the scope of the invention, which, as a matter of language, might be said to fall therebetween. Numerous other arrangements may be readily devised by those skilled in the art which will embody the principles of the invention and fall within the spirit and scope thereof.

Having described the invention, what I claim as new and desire to secure by Letters Patent is:

1. A turntable apparatus with universal, self-adjusting chuck for holding an auto wheel, or the like, comprising:
   (a) a turntable having at least three radially-disposed slots therein;
   (b) a hollow drive shaft, one end of which is centrally secured to the turntable for rotating the turntable;
   (c) at least three jaws for retention of a wheel, each of the at least three jaws being movably positionable along at least one of the radially-disposed slots;
   (d) a bearing assembly having an inner race and an outer race with bearings housed therebetween, the inner race being connected to the drive shaft;
   (e) a plate having a centrally located receptacle therein and having a plate aperture centrally located within the receptacle and passing through the plate, wherein the receptacle is adapted to receive the outer race therein, wherein the plate aperture is adapted for at least a portion of the drive shaft to pass through the plate to the place where the drive shaft is secured to the turntable, and wherein the drive shaft and turntable are rotatably movable relative to the plate;
   (f) at least one control arm for adjustable positioning each of the at least three jaws along at least one of the slots, each control arm having a pair of oppositely disposed control-arm portions with one control-arm portion rotatably connected to the plate and the other control-arm portion rotatably connected to at least one jaw;
   (g) at least one stop means for restricting movement of the bearing assembly in at least one direction along the axis of the drive shaft;
   (h) at least one locking arm means for locking the plate in position relative to the turntable, the locking arm means having a first locking-arm portion and a second locking-arm portion, the first locking-arm portion being fixedly connected to the plate with the locking arm means extending outwardly in a direction that is generally away from the axis of the drive shaft, such that the second locking-arm portion is located farther from the axis of the drive shaft than is the first locking-arm portion;
   (i) an actuator having a movable actuating part connected to the actuator, wherein the actuator is connected to the turntable and the actuating part is connected to the second locking-arm portion, with the actuating part being adapted for controllable movement of the actuating part by an energy source delivered to the actuator, and for said controllable movement of the actuating part to change the angular position of the locking arm means and thereby change the rotational position of the plate relative to the rotational position of the turntable; and,
   (j) transmitting means for delivering the energy source through the drive shaft to the actuator.

2. A turntable apparatus with universal self-adjusting chuck for holding an auto wheel, or the like, comprising:
   (a) a turntable having at least three radially-disposed slots therein, with said slots being substantially equidistant from one another;
   (b) a hollow drive shaft, one end of which is centrally secured to the turntable for rotating the turntable, wherein the drive shaft has a shaft conduit comprising an internal hollow portion of the drive shaft that extends along the axis of the drive shalt and can serve as a conduit for a fluid to flow between a first part of the drive shaft and a second part of the drive shaft;

(c) at least three jaws arranged relative to one another and adapted for retention of a wheel by an outside edge of the wheel upon application of force by each of the jaws directed toward the wheel, each of the at least three jaws being movably positionable along at least one of the radially-disposed slots;

(d) a bearing assembly having an inner race and an outer race with bearings housed therebetween, the inner race being connected to the drive shaft;

(e) a plate having a centrally located receptacle therein and having a plate aperture centrally located within the receptacle and passing through the plate, wherein the receptacle is adapted to receive the outer race therein, wherein the plate aperture is adapted for at least a portion of the drive shaft to pass through the plate to the place where the drive shaft is secured to the turntable, and wherein the drive shaft and turntable are rotatably movable relative to the plate;

(f) at least one control arm for adjustably positioning each of the at least three jaws along at least one of the slots, each control arm having a pair of oppositely disposed control-arm portions with one control-arm portion rotatably connected to the plate and the other control-arm portion rotatably connected to at least one jaw;

(g) at least one stop means for restricting movement of the bearing assembly in at least one direction along the axis of the drive shaft;

(h) at least one locking arm means for locking the plate in position relative to the turntable, the locking arm means having a first locking-arm portion and a second locking-arm portion, the first locking-arm portion being fixedly connected to the plate with the locking arm means extending outwardly in a direction that is generally away from the axis of the drive shaft, such that the second locking-arm portion is located farther from the axis of the drive shalt than is the first locking-arm portion;

(i) an actuator having a housing and a movable shaft, with the movable shaft comprising a housed portion and an extended portion, the housed portion being disposed within the housing and the extended portion extending outwardly from the housing, wherein the movable shaft is movable inwardly and outwardly relative to the housing and the relative proportions of the movable shaft that constitute the housed portion and the extended portion vary accordingly;

(k) wherein the housing is rotatably connected to the turntable and the movable shalt is rotatably connected to the second locking-arm portion; wherein the movable shaft is adapted for controllable movement in response to one or more forces that result from delivery of fluid pressure to the housing and for thereby moving the second locking-arm portion relative to the turntable; wherein the locking arm means is adapted for rotating the plate relative to the turntable in response to movement of the second locking-arm portion relative to the table; and, wherein each of the control arms is adapted for movement of at least one of the jaws along at least one slot in response to the plate rotating relative to the turntable; and wherein at least part of the one or more forces is transmitted from the actuator means to each of the jaws via a set of connected parts comprising at least one of the control arms, the plate, the locking arm means, and the movable shaft; and, (j) transmitting means for delivering the fluid pressure through the drive shaft to the actuator, said transmitting means comprising the shaft conduit, a supply conduit connected at one end to a point of supply for the fluid pressure and at the other end to the first part of the shaft conduit, and an actuator conduit connected at one end to the second part of the shaft conduit and at the other end to the actuator, and, wherein the connection between the supply conduit and the first part of the shaft conduit is via a rotatable connector.

3. The turntable apparatus of claim 1, wherein the at least one stop means is for restricting movement of the bearing assembly in both directions along the axis of the drive shaft.

4. The turntable apparatus of claim 1, wherein the at least one locking arm means has the first locking-arm portion fixedly connected to the plate with the locking arm means extending inwardly in a direction that is generally toward the axis of the drive shaft, such that the second locking-arm portion is located nearer to the axis of the drive shaft than is the first locking-arm portion.

5. The turntable apparatus of claim 1, wherein the locking arm means is the plate itself, with the first locking-arm portion being a first position on the plate and the second locking-arm portion being a second position on the plate.

6. The turntable apparatus of claim 1, wherein the actuator has a housing and wherein the moveable actuating part is a movable shaft, with an enclosed end of the movable shaft operably disposed within the housing and an extended end of the movable shaft projecting out through one end of the housing, the movable shaft being movable inward and outward relative to the housing in response to forces produced as a result of the energy source being delivered to the actuator; wherein the connections of the actuator to the turntable and the moveable shaft to the second locking arm are each rotatable connections.

7. The turntable apparatus of claim 1, wherein the energy source is pneumatic or other fluid pressure; wherein the drive shaft comprises a shaft conduit running from a first part of the drive shaft to a second pan of the drive shaft; wherein the transmitting means comprises the shaft conduit, a supply conduit connected at one end to a point of supply for the energy source and at the other end to the first part of the shaft conduit, and an actuator conduit connected at one end to the second part of the shaft conduit and at the other end to the actuator, and, wherein the connection between the supply conduit and the first part of the shaft conduit is via a rotatable connector.

8. The turntable apparatus of claim 3, wherein the energy source is pneumatic or other fluid pressure; wherein the drive shaft comprises a shaft conduit running from a first part of the drive shaft to a second part of the drive shaft wherein the transmitting means comprises the shaft conduit, a supply conduit connected at one end to a point of supply for the energy source and at the other end to the first part of the shaft conduit, and an actuator conduit connected at one end to the second part of the shaft conduit and at the other end to the actuator and, wherein the connection between the supply conduit and the first part of the shaft conduit is via a rotatable connector.

9. The turntable apparatus of claim 4, wherein the energy source is pneumatic or other fluid pressure; wherein the drive shaft comprises a shaft conduit running from a first part of the drive shaft to a second part of the drive shaft; wherein the transmitting means comprises the shaft conduit, a supply conduit connected at one end to a point of supply for the energy source and at the other end to the first part of the shaft conduit, and an actuator conduit connected at one end to the second part of the shaft conduit and at the other end to the actuator; and, wherein the connection between the supply conduit and the first part of the shaft conduit is via a rotatable connector.

10. The turntable apparatus of claim 5, wherein the energy source is pneumatic or other fluid pressure; wherein the drive shaft comprises a shaft conduit running from a first part of the drive shaft to a second part of the drive shaft; wherein the transmitting means comprises the shaft conduit, a supply conduit connected at one end to a point of supply for the energy source and at the other end to the first part of the shaft conduit, and an actuator conduit connected at one end to the second part of the shaft conduit and at the other end to the actuator; and, wherein the connection between the supply conduit and the first part of the shaft conduit is via a rotatable connector.

11. The turntable apparatus of claim 6, wherein the energy source is pneumatic or other fluid pressure; wherein the drive shaft comprises a shaft conduit running from a first part of the drive shaft to a second part of the drive shaft; wherein the transmitting means comprises the shaft conduit, a supply conduit connected at one end to a point of supply for the energy source and at the other end to the first part of the shaft conduit, and an actuator conduit connected at one end to the second part of the shaft conduit and at the other end to the actuator; and, wherein the connection between the supply conduit and the first part of the shaft conduit is via a rotatable connector.

12. The turntable apparatus of claim 1, further comprising a tension means having at least two ends, with one tension-means end connected to the turntable and another tension-means end connected to the locking arm means, providing tension between said connected tension-means ends.

13. The turntable apparatus of claim 3, further comprising a tension means having at least two ends, with one tension-means end connected to the turntable and another tension-means end connected to the locking arm means, providing tension between said connected tension-means ends.

14. The turntable apparatus of claim 4, further comprising a tension means having at least two ends, with one tension-means end connected to the turntable and another tension-means end connected to the locking arm means, providing tension between said connected tension-means ends.

15. The turntable apparatus of claim 5, further comprising a tension means having at least two ends, with one tension-means end connected to the turntable and another tension-means end connected to the locking arm means, providing tension between said connected tension-means ends.

16. The turntable apparatus of claim 6, further comprising a tension means having at least two ends, with one tension-means end connected to the turntable and another tension-means end connected to the locking arm means, providing tension between said connected tension-means ends.

17. The turntable apparatus of claim 2, further comprising a tension means having at least two ends, with one tension-means end connected to the turntable and another tension-means end connected to the locking arm means, providing tension between said connected tension-means ends.

18. The turntable apparatus claim 17, wherein the tension means is a spring.

* * * * *